United States Patent [19]

Fankboner

[11] Patent Number: 5,347,951
[45] Date of Patent: Sep. 20, 1994

[54] PROCESS FOR PRODUCING PEARLS IN ABALONE AND OTHER SHELL-BEARING MOLLUSKA AND NUCLEUS USED THEREWITH

[75] Inventor: Peter V. Fankboner, Coquitlam, Canada

[73] Assignee: Pacific Pearl Culture Ltd., Port Coquitlam, Canada

[21] Appl. No.: 82,496

[22] Filed: Jun. 28, 1993

Related U.S. Application Data

[63] Continuation-in-part of Ser. No. 836,161, Feb. 14, 1992, abandoned, Continuation-in-part of Ser. No. 614,303, Nov. 15, 1990, abandoned.

[51] Int. Cl.$^5$ .............................................. A01K 61/00
[52] U.S. Cl. ...................................... 119/244
[58] Field of Search .......................................... 119/244

[56] References Cited

U.S. PATENT DOCUMENTS

| | | | |
|---|---|---|---|
| Re. 18,700 | 12/1932 | Mikimoto | 119/244 |
| 988,889 | 4/1911 | Mikimoto | 119/244 |
| 1,176,090 | 3/1916 | Nishikawa | 119/244 |
| 1,328,008 | 1/1920 | Mikimoto | |
| 2,126,024 | 8/1938 | Mikimoto | 119/4 |
| 3,113,554 | 12/1963 | Kanai | 119/4 |
| 3,871,333 | 3/1975 | Gotoh | 119/4 |

FOREIGN PATENT DOCUMENTS

| | | | |
|---|---|---|---|
| 60860/69 | 3/1971 | Australia | 119/4 |
| 0071127 | 3/1988 | Japan | 119/4 |

OTHER PUBLICATIONS

Boutan/Lacaze-Duthiers, "The Artificial Production of Pearls in Haliotis", Comptes Rendus Hebdomadaine, vol. 127; 1898, pp. 828–830.
Uno, "Pearl Culture Using Abalone", The Aquaculture, 1957, 3(4):92–95.
Miwa, "Abalone Pearls", Mystery of the Pearl, 1980, Ch. 5, 92–93.
Wada, "Pearl Culture Using Abalone", In Pearls, 1982, Ch. 8, pp. 241–242.
Fankboner, "Pearl Culture in Abalone", Infofish International, Jul./Aug. 1991, pp. 52–55.
"Biffer Abalone Pearls in 1992", Hong Kong Jewelery, 1991, vol. 2 #50, pp. 90–91.

*Primary Examiner*—Gene Mancene
*Assistant Examiner*—Todd E. Manahan
*Attorney, Agent, or Firm*—Oyen Wiggs Green & Mutala

[57] ABSTRACT

The process includes the step of forming an opening in the shell of a host mollusk, such as an abalone, at a location covering a soft tissue thereof, such as the mantle-covered gonadal tissue. A pearl nucleus is then inserted into the opening. The pearl nucleus comprises a nucleating portion, typically semispherical in configuration, and a nut portion. The pearl nucleus is either threaded or configured to provide a tight frictional fit with the peripheral edge of the opening. The pearl nucleus is inserted into the opening and then turned by means of the nut portion to provide a very tight fit in the opening. In another embodiment, a pearl nucleus is drawn into the abalone in the vicinity of the head region, or through an opening formed in the abalone shell, by means of a probe which is introduced into the abalone through another smaller opening. The pearl nucleus is pulled into the abalone until it is seated adjacent the smaller opening, where it is held by tissue pressure and glue. The larger opening drilled in the abalone shell may be closed with an elongate pearl nucleus having a size and shape sufficient to pass through the opening in a first orientation and capable of substantially occluding the opening in a second orientation. In a further alternative embodiment, a pearl nucleus and piece of graft tissue are secured to one end of a curved, elongate probe and threaded through a soft tissue of the abalone to an implanted position. The same procedure may be employed for implanting graft tissue absent a pearl nucleus to form non-nucleated pearls. In a further alternative embodiment of the process, a pearl nucleus may be formed in a soft tissue of an abalone, such as the aductor muscle, by using a hypodermic syringe to inject a fast-setting resin into a cavity formed in the muscle tissue.

56 Claims, 15 Drawing Sheets

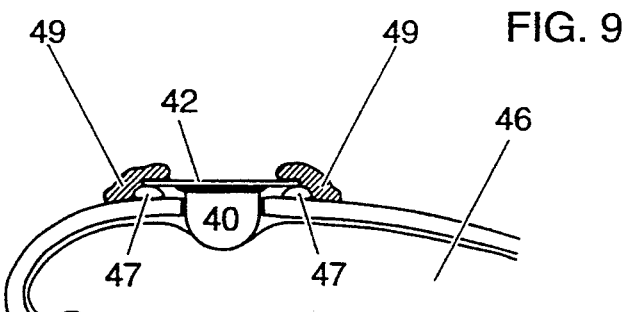
FIG. 9
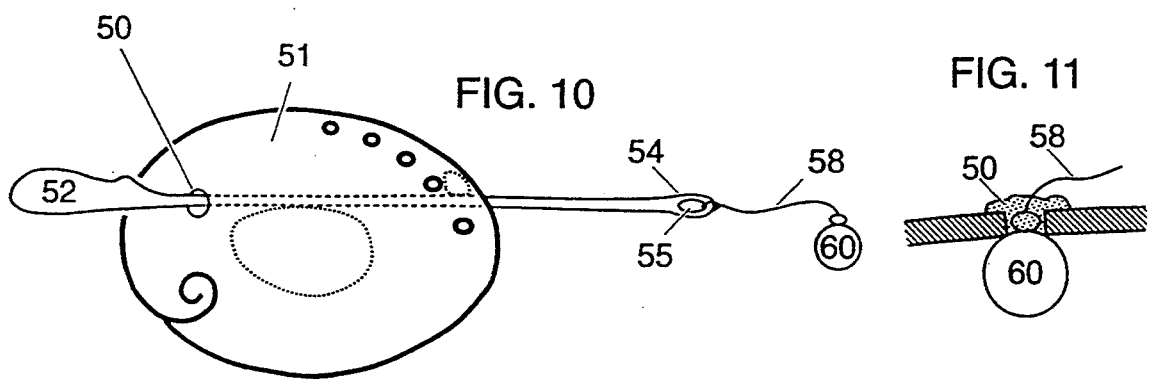
FIG. 10
FIG. 11
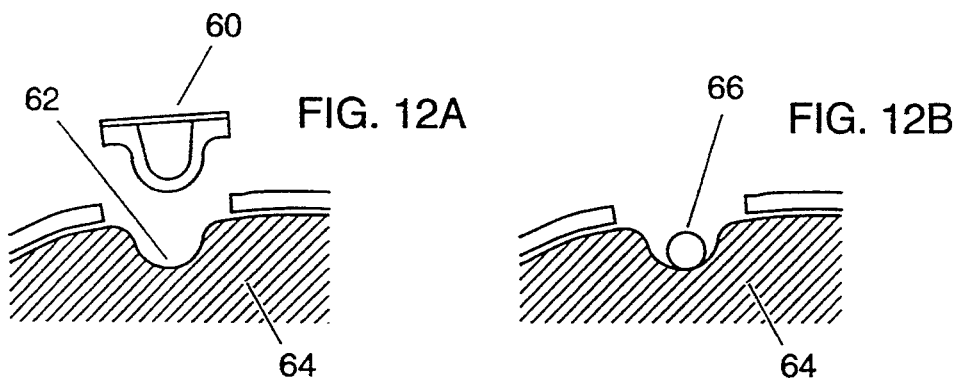
FIG. 12A
FIG. 12B
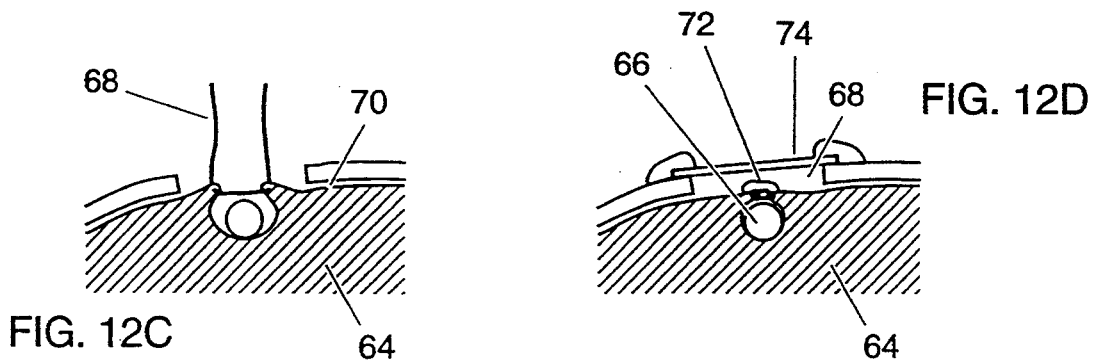
FIG. 12C
FIG. 12D FIG. 20
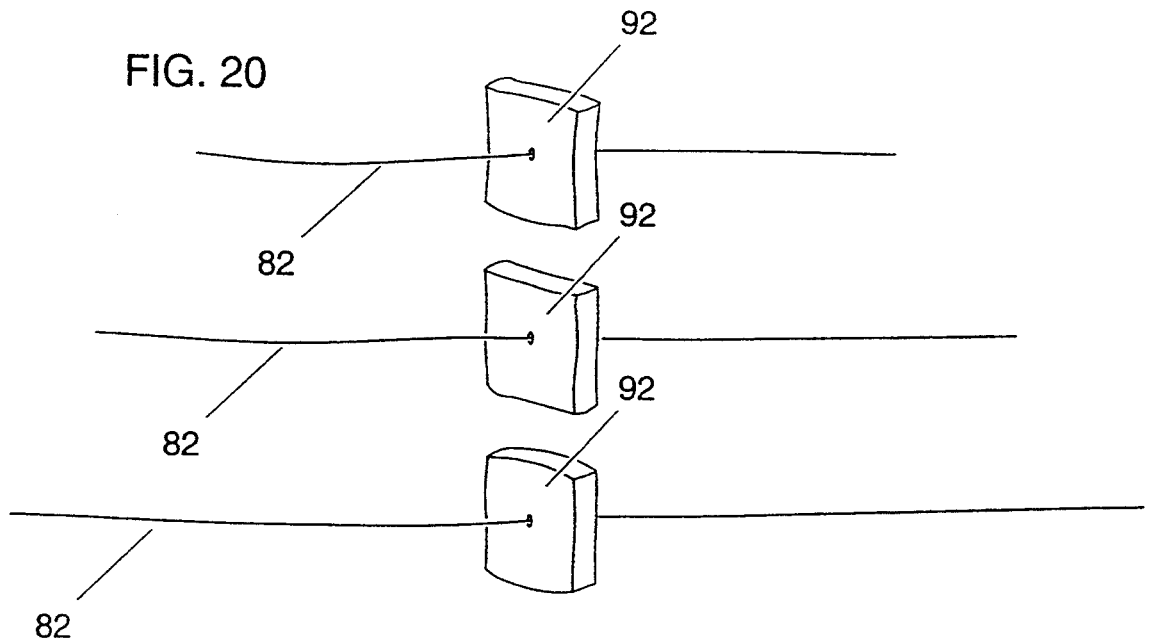
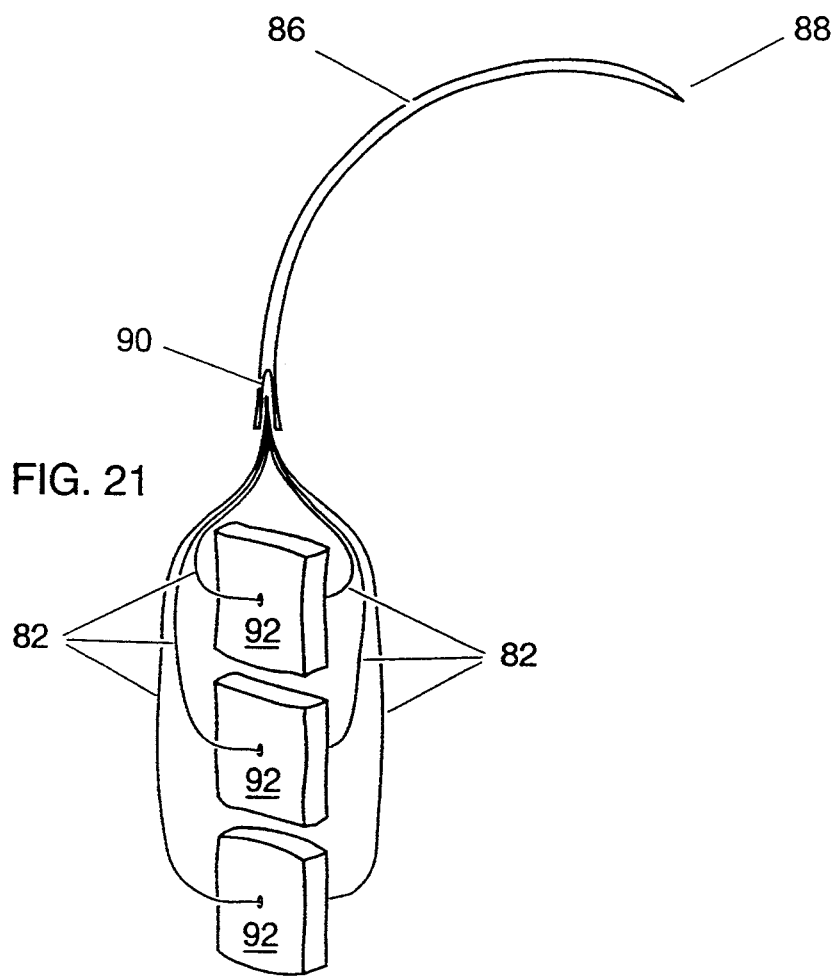
FIG. 21
FIG. 21(A)
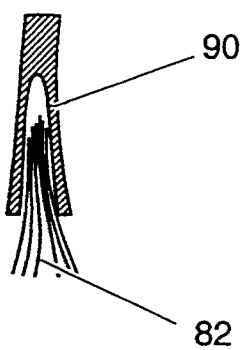

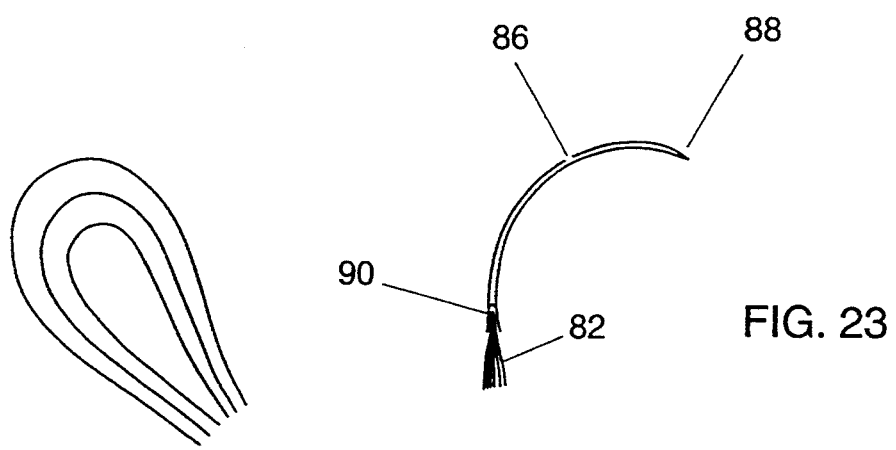
FIG. 23
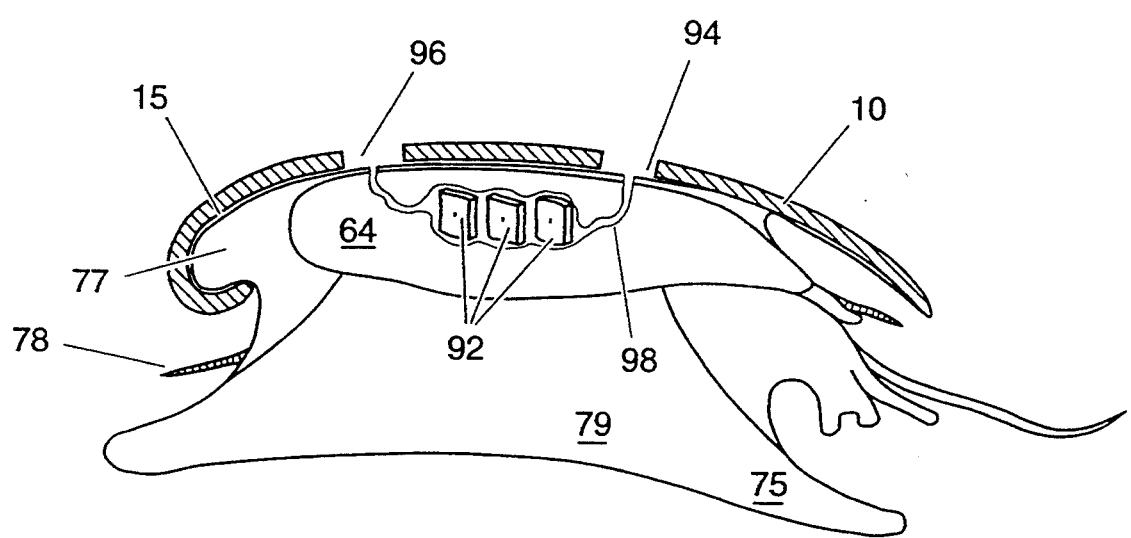

PROCESS FOR PRODUCING PEARLS IN ABALONE AND OTHER SHELL-BEARING MOLLUSKA AND NUCLEUS USED THEREWITH

This is a continuation-in-part of application Ser. No. 07/836,161 filed Feb. 14, 1992, now abandoned, which was a continuation of Ser. No. 07/614,303 filed Nov. 15, 1990, now abandoned.

FIELD OF THE INVENTION

This invention relates generally to the production of cultured pearls, and more specifically, to the nucleation of pearls in shell-bearing molluska such as abalone.

BACKGROUND OF THE INVENTION

The modern production of cultured pearls generally encompasses three basic techniques. First, spherical pearls of all sizes are produced by the well-known tissue-graft technique using a pearl nucleus, in various marine species of the pearl oyster as well as the fresh water mussel. Second, large (10–22 mm diameter) semispherical pearls are produced using the so-called "blister pearl" technique, again in pearl oysters and fresh water mussels. Third, irregular or baroque pearls are produced in fresh water mussels, using a multiple tissue-graft process without a pearl nucleus.

The production of cultured pearls in oysters, however, is limited geographically to a significant extent by the temperature of the sea water and other environmental conditions. A large number of potential growing areas for pearl oysters are excluded for these reasons, including the coastal waters of the eastern Pacific Ocean off the United States and Canada. However, several species of abalone, which have the ability to culture gem-quality pearls under selected conditions, are adapted for the cooler waters. Heretofore, abalone pearls have been cultured primarily by the Japanese. The available literature includes several papers which have been published in Japanese concerning the use of abalone to culture pearls. One of the earliest and most significant papers in the field is an article by Uno entitled "Pearl Culture Using Abalone," published in *The Aquaculture* in 1957. In this article, the production of both round and semispherical abalone pearls is discussed.

Abalone pearls are highly prized commercially, because their nacre (the deposited material) features the multi-hued colors so admired in abalone shells. The Uno article describes a general procedure for culturing blister pearls in abalone, including the initial step of abrading a hole using emery powder through the shell of the abalone, for the insertion of a nucleus element inside the shell. Next, a semispherical pearl nucleus is attached to a thin sheet of Bakelite plastic and is inserted through the abraded hole to a position against the abalone's mantle tissue. The thin plastic sheet is then cemented to the outside of the shell, holding the nucleus in place. The shape of the nucleus will determine the shape of the pearl.

Some success has been achieved in the production of semispherical pearls in abalone. Such pearls will typically range from 10–22 mm in diameter. However, attempts to produce spherical pearls in abalone using Uno's techniques have met with very little success, resulting in distorted pearl shapes and also a high incidence of infection, which in turn causes nucleus rejection and an increase in mortality of the animal. Hence, spherical pearls, as far as is known, are not currently being cultured in abalone.

U.S. Pat. No. 3,871,333, which issued to Gotoh on Mar. 18, 1975, relates to a method of producing cultured pearls in abalone which includes the steps of perforating a hole in the shell of the abalone overlying its reproductive organ and introducing a pearl nucleus assembly into the interior of the abalone through the hole. The Gotoh pearl nucleus assembly comprises a thin wire or pin, a round bead secured to one end of the pin which is positionable adjacent the reproductive organ of the abalone, an inner disk for substantially occluding the shell hole, and a larger outer disk which may be affixed to the abalone shell with a water insoluble bonding agent to maintain the assembly in place after implantation.

Historically, it has proven quite difficult, cumbersome, and time-consuming to insert pearl nuclei into abalone shells and the like and then glue them in place, such as is taught by Gotoh in the '333 patent. The primary drawback of this technique is that the bonding agent alone may not be sufficient to maintain the entire pearl nucleus assembly securely in place. Often the host abalone uses its powerful foot muscle to vigorously exert pressure against the inserted pearl nucleus which may dislodge the nucleus from the implanted position before conventional cements or glues have a chance to fully set. This is particularly the case if the abalone shell is not dry and free of surface films before the outer disk is bonded to the abalone shell. Cleaning and drying of abalone shells is simply not practical for large scale commercial applications where time is of the essence.

Further, with conventional techniques, the mortality rate for abalone is quite high, due to several factors, including tissue abrasion, thermal exposure and desiccation. The rate of infection is also relatively high, primarily due to tissue trauma resulting from abrading a hole through the shell of the abalone with emery powder or the like.

Accordingly, there is room for significant improvement in existing techniques for implanting pearl nuclei within molluska such as abalone for the culturing of pearls. In particular, it is desired that the present process be greatly reduced in time, increased in reliability, and that the mortality and rate of infection for the animal be significantly reduced.

SUMMARY OF THE INVENTION

In accordance with the invention, there is provided a process for nucleating pearls in shell-bearing molluska including abalone which includes the steps of (a) forming an opening in the shell of a host mollusk in a region covering a soft tissue thereof, the opening having a peripheral edge extending between an exterior surface and an interior surface of the shell; (b) providing a pearl nucleus having a first portion around which nacre forms and a second portion securely connected to the first portion and having a region larger than the size of the opening; and (c) manually inserting the nucleus through the opening to an implanted position wherein the nucleus first portion is compressed against the soft tissue of the mollusk and the nucleus second portion physically engages the peripheral edge of the shell opening with a sufficient degree of force to prevent expulsion of the nucleus by the host mollusk or other molluska.

The invention further includes a pearl nucleus for use in nucleating shell-bearing molluska including abalone. The pearl nucleus is of selected configuration, and includes a first portion around with nacre forms upon insertion of the pearl nucleus into the interior of a host mollusk through an opening formed in the shell thereof, the opening having a peripheral edge extending between an outer and an inner surface of the shell. The pearl nucleus also includes a plug-like second portion which is securely connected to the first portion and which includes securing means formed on an external surface thereof for physically engaging the peripheral edge of the shell opening with a sufficient degree of force to prevent expulsion of the nucleus by the host mollusk or other molluska.

Preferably, the securing means may include an externally threaded surface, a sloped or hyperbolic surface, or a plurality of resilient annular rings encircling the nucleus second portion for engaging the peripheral edge of the shell opening.

The invention may also include a process for nucleating pearls in shell-bearing molluska including abalone, which includes the steps of (a) forming an opening in the shell of a host mollusk in a region covering a soft tissue thereof; (b) inserting a pearl nucleus through the opening, the pearl nucleus including a nucleating portion and a disk portion which is substantially larger in diameter than the nucleating portion; (c) gluing the disk portion to the shell; and (d) clamping the disk portion in place until the glue sets, by means of a clamp which is configured to fit around a portion of the shell and which includes end portions configured to grip the edges of the shell.

In a further alternative embodiment of the invention a process for nucleating pearls in shell-bearing molluska including abalone may include the steps of (a) forming an opening in the shell of a host mollusk in a region covering a soft tissue thereof; (b) inserting an elongated probe through the opening and passing the probe through an interior cavity of the mollusk between the soft tissue and the shell until a tip of the probe is exposed from the mollusk; (c) securing a filament to the exposed tip of the probe, the filament having a pearl nucleus secured thereto which is larger than the size of the opening; (d) withdrawing the probe and at least part of the filament through the opening, thereby pulling the nucleus through the cavity until the nucleus is positioned against the opening; and (e) securing the pearl nucleus to a portion of the shell adjacent the opening.

The invention further includes a process for nucleating spherical pearls in shell-bearing molluska including abalone which includes the steps of (a) making an opening in the shell of a host mollusk in a region covering a soft tissue thereof; (b) inserting a pearl nucleus through the opening until at least part of the nucleus is securely compressed against the soft tissue; (c) allowing the pearl nucleus to remain in the mollusk for a sufficient period of time such that the soft tissue in the vicinity of the pearl nucleus forms a cup-like cavity; (d) removing the pearl nucleus from the mollusk, thereby exposing the cavity formed in the soft tissue; (e) inserting a spherical pearl nucleus into the cavity; (f) suturing the soft tissue so as to close the tissue substantially around the spherical nucleus; and (g) closing the opening in the molluska shell.

The invention also includes a process for nucleating pearls in shell-bearing molluska which includes the steps of (a) securing a pearl nucleus to one end of a thin filament; (b) securing the other end of the filament to a trailing end of an elongate probe; (c) threading the probe and the filament through a piece of graft tissue until the tissue is positioned immediately adjacent the nucleus; (d) forming a first opening in the shell of a host mollusk, the first opening having a size exceeding the size of the pearl nucleus; (e) forming a second opening in the shell of the mollusk spaced apart from the first opening; (f) inserting a leading end of the elongate probe through the first opening into a soft tissue of the mollusk and passing the probe through the soft tissue until the probe leading end emerges from the second opening; (g) withdrawing the probe and the filament from the mollusk through the second opening until the nucleus and the tissue graft become lodged within the soft tissue adjacent the second opening; and (h) severing the nucleus from the filament.

The invention also relates to a process for culturing non-nucleated free pearls in shell-bearing molluska including abalone, which includes the steps of (a) loosely threading a thin filament through a piece of tissue graft; (b) securing the free ends of the filament to a trailing end of an elongate probe; (c) forming a first opening in the shell of a host mollusk in a region covering a soft tissue thereof; (d) forming a second opening in the shell of the mollusk spaced apart from the first opening but also covering the soft tissue; (e) inserting a leading end of the probe through the first opening and passing the probe through the soft tissue until the probe leading end emerges from the second opening; (f) withdrawing the probe and part of the attached filament from the mollusk through the second opening; (g) severing the filament from the probe; and (h) removing the filament from the mollusk through the second opening by pulling one of the severed ends of the filament, thereby leaving the tissue graft embedded in the soft tissue.

The invention still further includes a process for nucleating pearls in shell-bearing molluska including abalone, which includes the steps of (a) charging a hypodermic needle with a solution comprising nacre secretion stimulating material; (b) introducing the needle into a soft tissue of a host mollusk; (c) injecting the solution into the soft tissue to form a cavity therein, wherein the nacre secretion stimulating material is deposited on a portion of the soft tissue lining the cavity; (d) withdrawing the solution from the soft tissue to cause substantial collapse of the cavity; (e) charging the hypodermic needle with liquid epoxy resin; (f) injecting the liquid epoxy resin into the cavity; and (g) withdrawing the hypodermic needle from the soft tissue after a time period sufficient to allow the epoxy resin to set within the cavity to form a pearl nucleus therein.

The invention still further includes a process for nucleating pearls in shell-bearing molluska including abalone which includes the steps of (a) forming an opening in the shell of a host mollusk in a region covering a soft tissue thereof; (b) providing a pearl nucleus of a size and shape sufficient to pass through said opening in a first orientation and capable of substantially occluding the opening in a second orientation; (c) manually inserting the pearl nucleus through the opening in the first orientation to a position adjacent the soft tissue; and (d) securing the nucleus in the second orientation against an inner surface of the shell adjacent the opening to substantially occlude the opening.

BRIEF DESCRIPTION OF THE DRAWINGS

In drawings which illustrate embodiments of the invention, but which should not be construed as restricting the spirit or scope of the invention in any way.

FIG. 9 is a longitudinal sectional view showing another process for securing a pearl nucleus to an abalone shell.

FIG. 10 is a schematic view illustrating a process for implanting pearl nuclei in abalone using an elongate probe.

FIG. 11 is an enlarged, sectional view showing a process for securing an implanted pearl nucleus to the abalone shell.

FIGS. 12A–12D show a series of steps in a process for culturing a spherical pearl in an abalone.

FIG. 20 is an isometric view of a plurality of tissues grafts and filaments used in an alternative embodiment of the invention for producing non-nucleated free pearls in abalone.

FIG. 21 is an isometric view of an implantation assembly incorporating an arcuate probe and the tissue grafts and filaments of FIG. 20.

FIG. 21(A) is an enlarged view of one end of the probe of FIG. 21 showing a cavity for receiving the free ends of the filaments.

FIGS. 22–23 illustrate a process for producing non-nucleated pearls in abalone using the implantation assembly of FIG. 21.

DETAILED DESCRIPTION OF THE PREFERRED EMBODIMENTS

Figure 1:
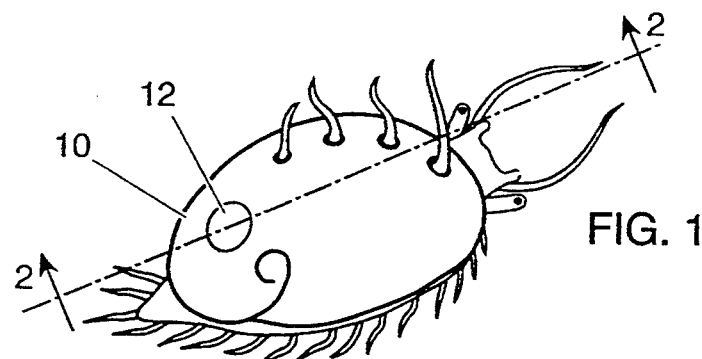
FIG. 1 is a simplified isometric view of a live abalone.
Figure 2:
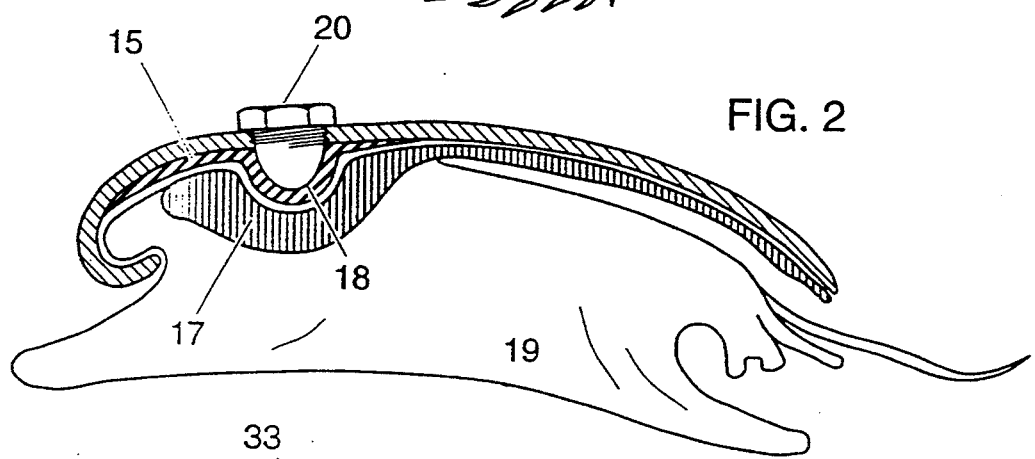
FIG. 2 is a longitudinal sectional view taken along section lines 2—2 of FIG. 1 and showing one embodiment of a pearl nucleus implanted within an abalone.

Referring initially to FIGS. 1 and 2, one preferred embodiment of the process of the present invention uses a particular configuration of a pearl nucleus, which may include a nucleating portion and a nut-like portion which extends above the surface of the abalone shell 10, or may include a nucleating portion with an inset portion in the upper surface of the nucleating portion to receive a drive tool or the like. An opening 12 to accommodate the pearl nucleus is drilled in the abalone shell 10 as shown in FIG. 1. Opening 12 in shell 10 is preferably formed in a region of shell 10 covering a soft tissue of the abalone. As used throughout this application, the term "soft tissue" refers to any part of the visceral mass of a host mollusk which will produce nacre in response to the implantation of a foreign body.

As shown in FIGS. 1 and 2, one preferred site for drilling opening 12 is over the dorsal, flattened surface of the mantle 15 and gonad 17 of the abalone, which is typically found to the left of the shell spire and several millimeters away from the region of attachment of the foot muscle 19 to the shell 10 of the abalone. It is at this position where the highest quality nacre usually results; also, there typically is sufficient room in this area of the abalone for the mantle 15 and gonad 17 to adjust to the intrusion of the nucleating portion. The tissue will typically redistribute to fill the resulting space between the shell, the inserted nucleating portion and the visceral mass.

Opening 12 is preferably made in the abalone shell 10 with a diamond core drill. Careful use of the diamond drill results in a round (not irregular) opening 12 which is perpendicular to the surface of the shell 10 at that point. A collar may be used with a set screw to provide control over the depth of the cut of the drill. In the embodiment shown, the drill is typically set for a depth approximately 1 mm larger than the thickness of the shell 10. This permits the drill to penetrate completely through the shell 10 but prevents it from cutting into mantle 15 and gonadal tissues 17 of the abalone.

In the embodiment shown, opening 12 has a diameter of 13 mm or 16 mm which are used for 13.5 mm and 16.5 mm diameter nuclei, respectively. However, the size of the opening 12 in the shell 10, and the size of the nuclei to be implanted, can of course be varied.

Figure 3:
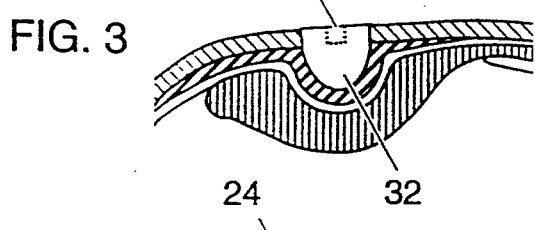
FIG. 3 is a partial longitudinal sectional view showing another embodiment of a pearl nucleus implanted within an abalone.
Figure 4:
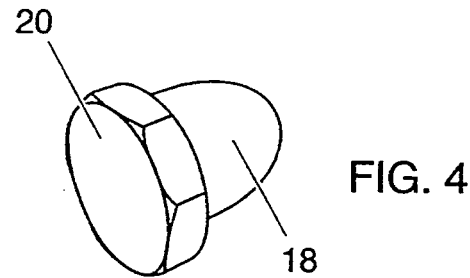
FIG. 4 is an isometric view showing another embodiment of a pearl nucleus.

The configuration of one preferred pearl nucleus is shown in FIG. 2, with one variation being shown in FIG. 3 and other variations shown in FIGS. 4–8. In most of these configurations, however, the pearl nucleus comprises an integral combination of a nucleating portion and a nut portion or element located at the base of the nucleating portion which facilitates the insertion of the nucleating portion into the abalone. FIGS. 2 and 4 show a semispherical nucleating portion 18 with a hexagonal nut portion 20. In one example the nucleating portion 18 has a diameter of 13 mm. The total height of the nucleating portion in this example from base to tip is also 13 mm, although this may vary. The nucleating portion 18 has a true semispherical part and a cylindrical section or part which in effect "connects" the true semispherical part to the nut portion. In the example given, the cylindrical part is 13 mm in diameter and approximately 6⅛ mm long. This in effect is an extension of the nucleating portion, so that a true semispherical pearl may be severed from the remainder of the pearl nucleus at the conclusion of the process when the entire pearl nucleus is removed from the host abalone.

The nut portion 20 of the pearl nucleus of FIGS. 2 and 4 has a hexagonal outline (6 equal length sides) with the distance between opposing sides being approximately 18 mm. The nut portion 20 has a thickness in the embodiment shown of approximately 5 mm.

The pearl nucleus may be made of a variety of materials, but specific examples include mother of pearl, polyester resin, cold cure epoxy, and an acrylic. Selection of a specific material will depend to some extent on the method used for driving the pearl nucleus into the abalone, as described below.

Figure 5:
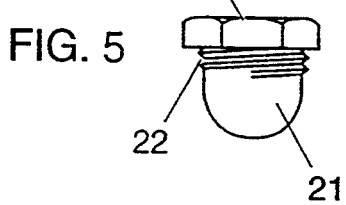
FIGS. 5–8 are side views showing various other pearl nuclei configurations useful in the process of the present invention.

Referring to FIG. 5, the pearl nucleus could include a threaded portion 22 at the base of nucleating portion 21 adjacent a nut portion 24. A threaded pearl nucleus is shown in place in an abalone in FIG. 2. Instead of threads, annular rings could be used.

When the pearl nucleus is threaded, it is made slightly oversize and the material is such (like polyester resin) that the pearl nucleus is self-tapping as it is inserted and seated.

Figure 7:
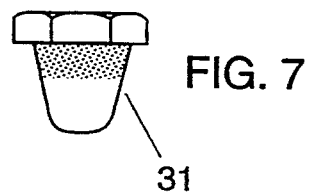

A pearl nucleus 31 may also have sloping sides, as shown in FIG. 7, to better effect a frictional fit. The sloping sides may be smooth or slightly roughened, as shown. Hyperbolic-shaped nuclei may also be usefully employed to effect a frictional fit. As should be apparent to someone skilled in the art, other nucleus shapes could be used to produce different pearl shapes.

Figure 6:
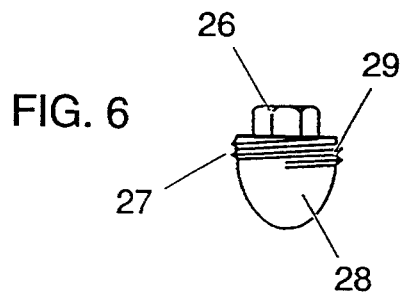
Figure 8:
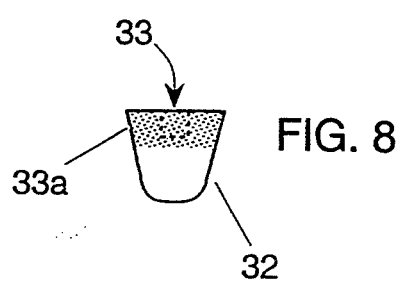

Two other pearl nucleus alternative shapes are shown in FIGS. 6 and 8. In FIG. 6, the nut portion 26 of the pearl nucleus 27 has a smaller diameter than the nucleating portion 28. Typically, this embodiment will include threads 29 at the base of the nucleating portion 28 adjacent the nut portion 26. FIG. 8 shows a pearl nucleus 32 with sloping sides (smooth or slightly roughened), with an opening 33 in the base of the pearl nucleus to receive a tool for seating the nucleus. The diameter of the pearl nucleus in the region labelled 33a will be larger than the diameter of opening 12 in shell 10, such that a frictional fit holds the pearl nucleus in place. This embodiment, which is shown positioned in an abalone in FIG. 3, does not have a separate nut portion per se, but does preferably include an element or means by which the pearl nucleus can be turned and hence seated following insertion.

As mentioned above, in the nucleating process, a pearl nucleus of selected configuration is manually inserted into the opening 12 in the shell 10 of the abalone such that the tip of the nucleus is compressed against a soft tissue of the abalone, such as gonadal tissue 17 (FIGS. 2 and 3). After the pearl nucleus has been inserted by hand, a tool (not shown) is ordinarily used to turn the pearl nucleus several times, resulting in the nucleus being threaded into the opening 12 or having a tight frictional fit with the sides of the opening 12. While a true frictional fit typically requires that the sides of the nucleus slope outwardly to some extent to provide the tight fit required, a threaded or annular arrangement may not require that the sides slope. The threaded or frictional fit arrangement, with the nucleus forcefully engaging the peripheral edge of the opening 12 in the abalone shell 10, has been discovered to provide the required resistance to prevent the pearl nucleus from being expelled by the action of the host abalone or other abalone in the same underwater community.

To further ensure that the pearl nucleus in fact stays firmly seated in the abalone, an underwater epoxy putty or a few drops of a super glue can be applied between the undersurface of the nut portion of the nucleus and the shell 10, in effect gluing the nut portion to the outer surface of the shell 10.

Use of the above-described pearl nucleus configurations, providing either a threaded or a frictional fit in the opening, has the significant advantage of dramatically increasing the number of abalone which can be nucleated in a given amount of time while simplifying the nucleating task. It has also been discovered that the above-described process results in a very high percentage of stable nuclei, i.e. the abalone does not dislodge or expel the implanted pearl nucleus. The high rate of stable nuclei also significantly reduces the rate of abalone mortality.

As an alternative to the threaded/frictional fit pearl nucleus configurations, a more conventional but less preferred arrangement is shown in FIG. 9. In this embodiment, a conventional semispherical pearl nucleus 40 is glued or otherwise secured to a thin disk 42, which has a larger diameter than the diameter of the nucleus 40 and the opening 44 in the abalone shell. The nucleus 40 is inserted through the opening 44, against the soft tissue 46 of the abalone. The disk 42 is glued to the shell using super glue, shown at 47, with the assistance of special enhancers (accelerators) which cause the glue to set in a very short period of time, i.e. 15 to 20 seconds. A more permanent adhesive, such as underwater epoxy putty 49, may also be applied between the peripheral edge of the disk 42 and the shell of the abalone to assist in securing the disk to the shell.

Figure 13:
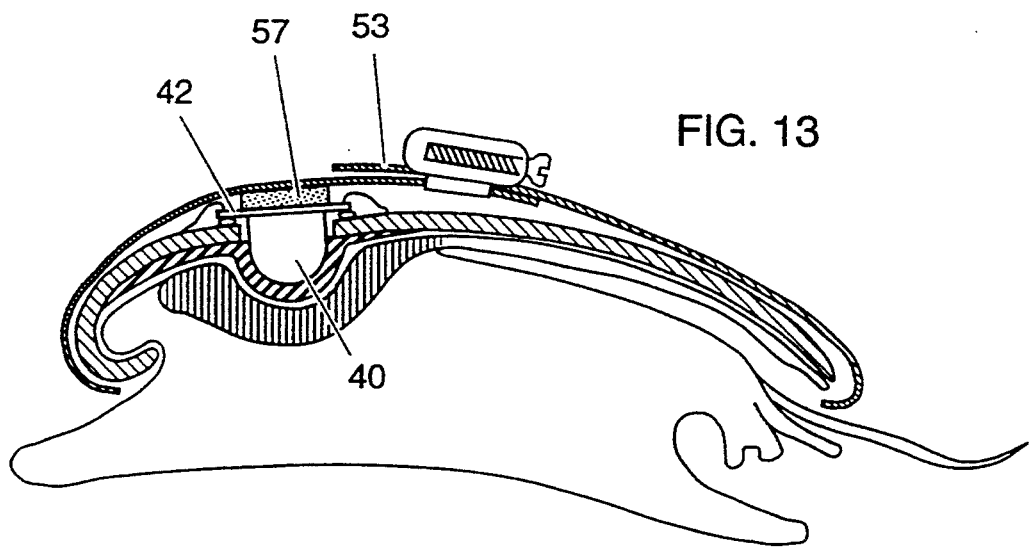
FIG. 13 shows a process for securing an implanted nucleus to the abalone shell using a clamp apparatus.

Underwater epoxy putty 49 may require a setting time of 1–12 hours. Thus a clamp 53, such as a modified stainless steel hose clamp, can be used to hold the pearl nucleus in place while the glue sets as shown in FIG. 13. In this embodiment, a rubber pad 57 is positioned on the upper surface of the disk 42 with the clamp 53 pressing down against the pad, applying pressure against the disk 42, as the clamp is tightened. The clamp 53 extends around a substantial portion of the abalone, as shown. The use of a clamp permits the use of a wider variety of glues with longer setting times. The embodiments shown in FIGS. 9 and 13, however, both require significantly more effort and time for nucleation compared with the preferred embodiments described above.

FIGS. 10 and 11 show a further alternative apparatus and method for threading a pearl nucleus into an abalone. In this process, a small opening 50 (on the order of 3–5 mm diameter) is drilled in the shell 51 of the abalone at a similar location to that shown in FIG. 1. The opening 50 is large enough to accommodate a thin flexible probe 52 which may be made of metal or plastic. One end 54 of the probe has a circular opening or loop 55. The probe 52 is pushed through the hole 50 toward the abalone's head region (slightly to the left thereof) between the shell 51 and the underlying mantle tissue. The probe is passed through the interior of the abalone between the right and left aductor muscles until the probe end 54, with its circular loop 55, emerges from between the shell and the mantle near the head of the abalone. A thread 58 is then drawn through the loop 55 and tied to the end 54. The other end of the thread 58 has a pearl nucleus 60 secured thereto. While the pearl nucleus shown is spherical, other shapes, such as oval, teardrop and baroque could be readily used.

The probe 52 is then withdrawn from the opening 50, thereby pulling the pearl nucleus 60 into the abalone between the mantle and shell 51 and towards the soft tissue underlying opening 50. When the probe 52 has been withdrawn completely from the abalone and the start of the thread 58 is revealed at opening 50, the thread 58 is then pulled until the pearl nucleus 60 arrives at the opening 50. The pearl nucleus 60, which is larger than opening 50, is held against the interior surface of the shell 51 by means of the thread 58. A drop or so of super glue is used to secure the pearl nucleus 60 to the shell 51 and to seal the opening 50, as best shown in FIG. 11. In carrying out this process, an anesthesia such as a 7% solution of magnesium chloride in tap water is helpful to relax the abalone so that the nucleus 60 can be more easily pulled between the mantle and the shell 51.

Figure 14:
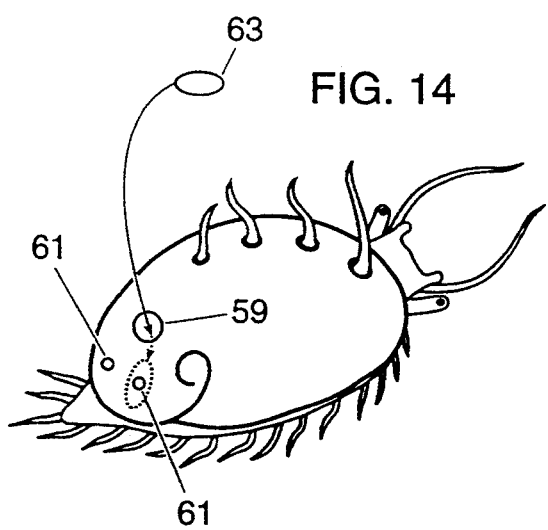
FIGS. 14 and 14a show further processes for implanting nuclei in an abalone to produce pearls of various configurations.
Figure 14A:
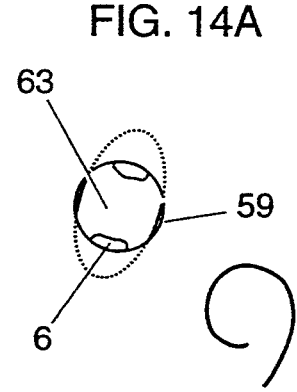

FIGS. 14 and 14a illustrate variations of the method described above. A relatively large opening 59 is drilled in the shell of the abalone, as well as one or more relatively small (3–5 mm diameter) openings 61. Again, a probe (not shown) may be inserted into the abalone through one of the smaller openings 61 and then out through the larger opening 59. A pearl nucleus 63 of selected configuration, after attachment to the end of the probe by a thread or the like, may then be pulled into the abalone through opening 59 and then glued in place as shown by the dotted lines in FIG. 14 and as discussed above. A drop or so of super glue 6 may be used to secure the pearl nucleus 63 in place.

Several pearl nuclei may be consecutively implanted in one host abalone using the above-described procedure adjacent respective openings 61. The pearl nuclei may also be inserted into the abalone through opening 59 with forceps or some other placement tool. Such nuclei may be pre-glued or may simply be positioned against the interior surface of the shell, with the pressure of the visceral mass in effect holding the nuclei in place in the abalone. The shell opening 59 may then be closed with a pearl nucleus such as shown in FIGS. 2 or 3.

As shown best in FIG. 14a, an elongated nucleus 63 may also be used for closing a relatively large opening formed in the abalone shell. Preferably nucleus 63 is of a size and shape capable of passing through the shell opening in a first orientation, and also capable of substantially occluding the opening in a second orientation. Nucleus 63 is first secured to a thread or some other thin filament and inserted through the shell opening in the first orientation until at least part of the nucleus 63 is compressed against a soft tissue of the abalone, such as the gonadal tissue. Nucleus 63 is then manually rotated until it substantially occludes the shell opening as shown in FIG. 14a. Prior to final implantation of nucleus 63, the attached filament may be used to guide nucleus 63 and to maintain it braced against the inner shell of the abalone. The muscular action of the abalone itself also helps to brace the pearl nucleus 63 in position. Nucleus 63 is then affixed to the abalone shell using a drop or so of super glue 6 as discussed above, and the filament is severed from nucleus 63.

The FIG. 14 procedure for implanting a nucleus 63 within an abalone has several important advantages. Firstly, no part of the implanted nucleus 63 projects outwardly of the host abalone shell, as shown in FIG. 14a. Accordingly, it is virtually impossible for the implanted nucleus to be dislodged by other abalone in the same underwater community or by other marine organisms. Secondly, the muscular action of the host abalone itself, in attempting to expel the foreign nucleus 63, actually serves to brace the implanted nucleus in place against the shell inner surface. Thirdly, since the nucleus completely or substantially occludes the opening formed in the abalone shell, there is no need to painstakingly affix another disc to the shell in order to cover the opening. Rather, the nucleus 63 itself prevents foreign organisms and materials from passing through the shell opening into the interior of the abalone, which is a primary cause of infestation, infection and tissue trauma. Finally, elongated nuclei suitable for this procedure yield attractive baroque-shaped pearls which require minimal finishing.

As should be apparent to someone skilled in the art, in alternative embodiments of the invention nucleus 63 may comprise an elongated disc and a spherical or semispherical bead portion affixed to the disc. As discussed above, the key feature is that the entire nucleus 63 be of a size and shape capable of passing completely through the shell opening in one orientation, and also capable of occluding the opening in another orientation.

After nucleation of the abalone is completed, the abalone is replaced in conventional underwater growing beds or farms. Over a period of time, the abalone deposits a layer of nacre around the portion of the nucleus element (the nucleating portion) which extends into the interior of the abalone. After a period of 3 to 24 months, the abalone is removed from the abalone bed and the pearl nucleus is removed. A layer of nacre will have been overlaid on the nucleating portion, producing a pearl which conforms to the shape of the nucleating portion. The time that it takes for the abalone to produce the pearl will vary somewhat, but 3 to 8 months has been usually found to be sufficient to produce semi-spherical blister pearls. Typically, the thickness of the deposited nacre will be approximately at least 0.35 mm. When the pearl nucleus is removed, the exposed (non-nacred) portion of the pearl nucleus, i.e. the nut portion and the threaded portion, if any, is cut off, leaving a semispherical, hyperbolic or other shaped pearl, depending upon the shape of the pearl nucleus. These pearls are typically of gem quality and can be used in various jewellery and other applications.

As indicated above, one advantage of the technique illustrated in FIGS. 14 and 14a is that the entire pearl nucleus may be braced within the interior of the abalone against the shell. Accordingly, when the nucleus is harvested, it is not necessary to cut off or grind down a non-nacred portion of the nucleus (which is often a time-consuming and labour-intensive procedure).

FIGS. 12A and 12D illustrate a procedure for culturing spherical pearls in abalone which have previously been used for the culture of semispherical pearls using a pearl nucleus such as described above. When the pearl nucleus 60 is removed from the abalone, with its semispherical or other shaped pearl, as shown in FIG. 12A, a cup-like depression or cavity 62 remains in the soft tissue 64 (such as the gonadal tissue overlaid by the mantle). A spherical nucleus 66 is then positioned within the cavity 62, as shown in FIG. 12B. A suture 68, made with either dissolving or non-dissolving thread, is then run through the soft tissue 64 just below the upper boundary of the cavity 62, adjacent the interior surface 70 of the shell. The suture 68 is then drawn tight, somewhat like a purse string, drawing the soft tissue together around the spherical nucleus, and a knot is made in the thread, as shown in FIG. 12D.

A drop or so of super glue is then typically applied to the suture knot where the soft tissue closes upon itself. An accelerator can be used to speed the setting of the glue. The opening 72 in the shell of the abalone is then covered with a thin disk 74, which is glued to the shell. When the pearl is to be harvested, the disk 74 is removed and the spherical pearl is then surgically removed. This process can be repeated as long as the cavity in the abalone tissue remains intact and high quality pearls are produced. One advantage to this method is that the initial semispherical or other shaped pearl will reveal the characteristics of the nacre produced by that particular abalone and, therefore, future abalone hosts for spherical pearls can be pre-selected depending upon the quality of nacre produced during culture of the initial blister pearl.

Figure 15:
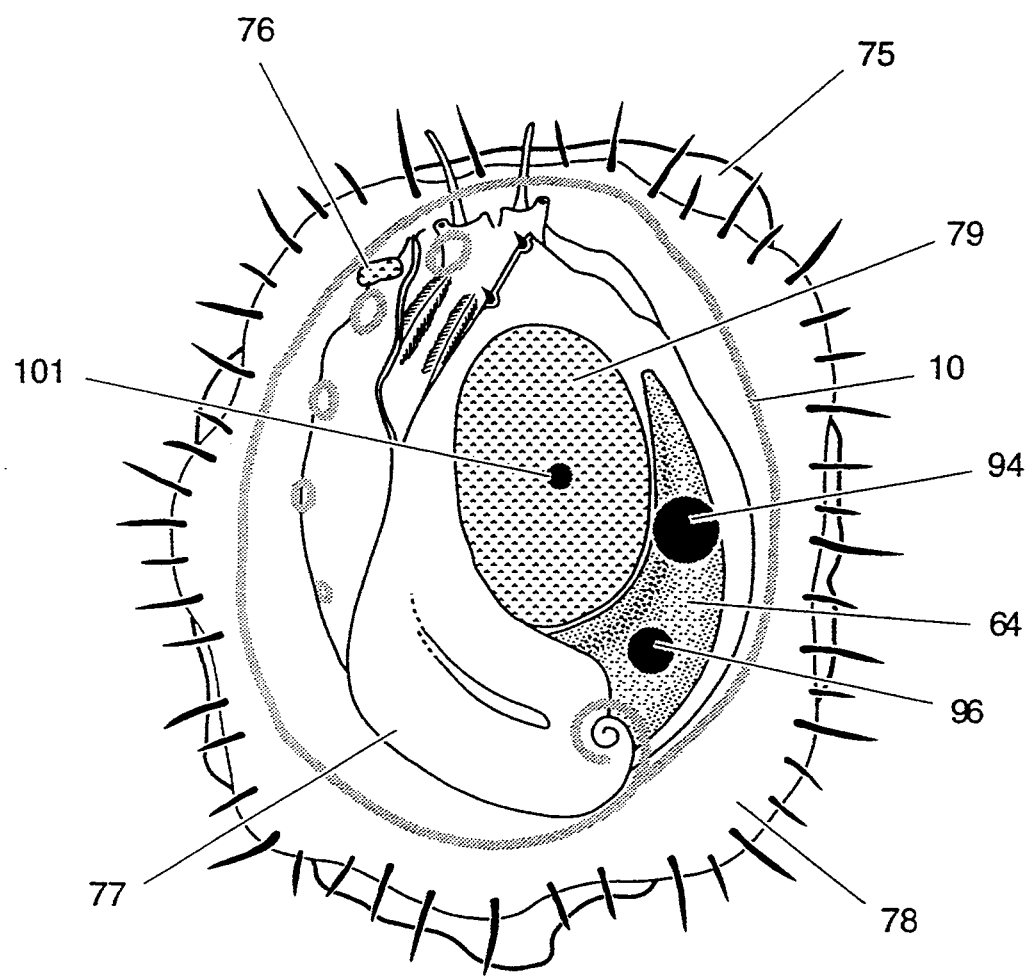
FIG. 15 is a schematic view of a live abalone with the shell partially removed to expose the internal organs.

FIG. 15 is a schematic view of a host abalone with shell 10 rendered transparent to expose gonad 64, foot 75, left adductor muscle 76, digestive diverticula 77, epipodium 78, and right adductor muscle 79. In further alternative embodiments of the invention described below, pearl nuclei are implanted in gonad 64 and adductor muscle 79. However, as should be apparent to someone skilled in the art, other abalone soft tissue may also be successfully employed as nucleus implantation sites.

Figure 16:
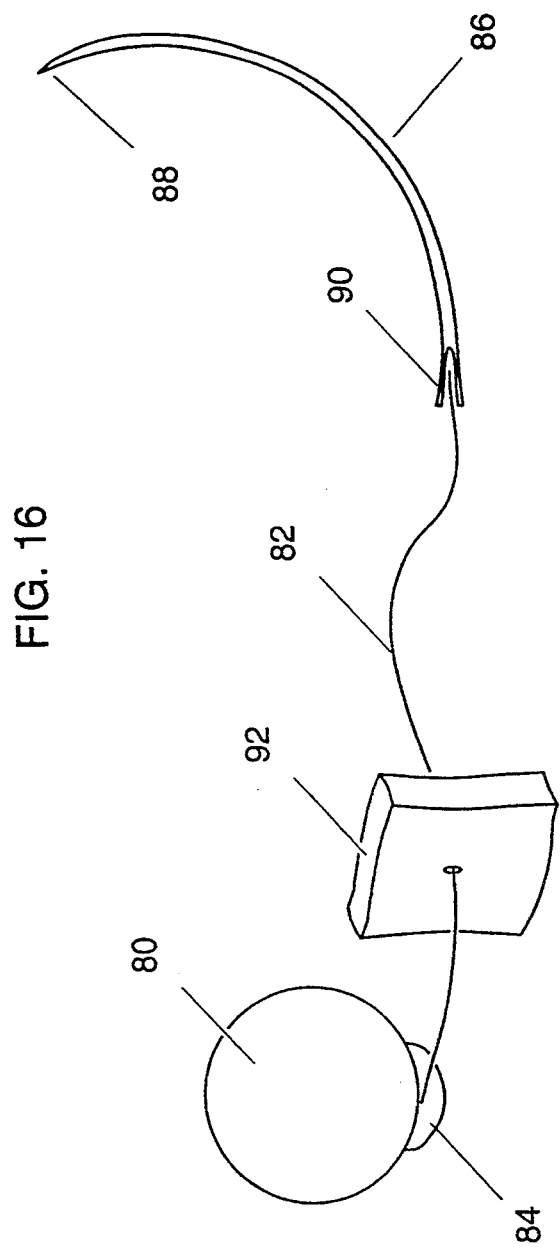
FIG. 16 is a schematic view of an alternative nucleus implantation assembly for producing pearls in abalone.

In the alternative process shown in FIGS. 16–19 a pearl nucleus 80 is threaded through the abalone gonadal tissue 64. As best shown in FIG. 16, nucleus 80 is first secured to one end of a thin filament 82, such as with a drop of adhesive 84. Nucleus 80 is typically on the order of 3–7 mm in diameter. The other end of filament 82 is secured to a thin probe, such as a suture needle 86 having a leading end 88 and a trailing end 90. The probe 86 and filament 82 are threaded through a small piece of graft tissue 92 to complete the nucleus implantation assembly. Graft tissue 92 is typically harvested from the mantle tissue of a host abalone. Alternatively, graft tissue 92 may consist of other types of abalone tissue, or tissue from other organisms capable of triggering the secretion of nacre.

Figure 17:
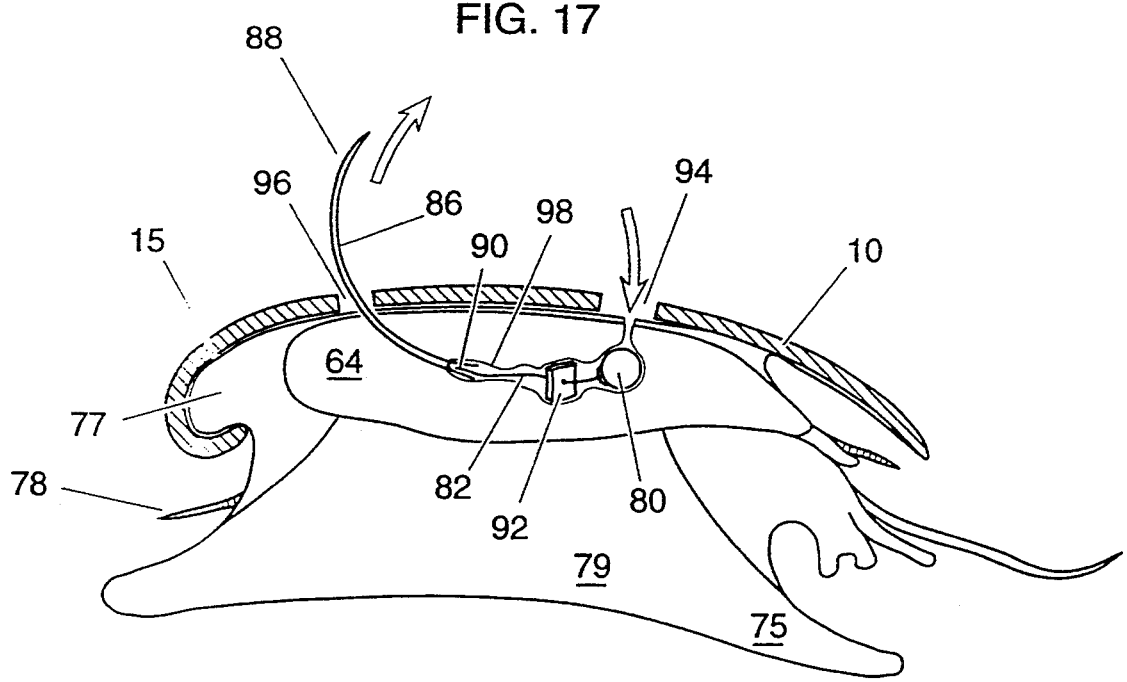
FIG. 17–19 illustrate another process for implanting nuclei in abalone using the assembly of FIG. 16.

FIG. 17 illustrates the preferred procedure for introducing the nucleus implantation assembly into an abalone. A first opening 94 having a diameter exceeding the diameter of nucleus 80 is drilled in the abalone shell 10 at a location overlying gonadal tissue 64. A second opening 96 is also drilled in the abalone shell at a location spaced apart from the first opening 94, but still overlying gonadal tissue 64. Preferably the second opening 96 is smaller in diameter than nucleus 80 (FIG. 15).

Probe 86 is inserted into gonadal tissue 64 through opening 94 and is guided until its leading end 88 emerges from opening 96. Preferably probe 86 is arcuate-shaped to facilitate passage of probe 86 between openings 94 and 96. Probe 86 thus defines a curved wound channel 98 through which nucleus 80 and associated graft tissue 92 pass. Since gonadal tissue 64 is not highly vascularized, this procedure does not result in significant trauma to the abalone.

Figure 18:
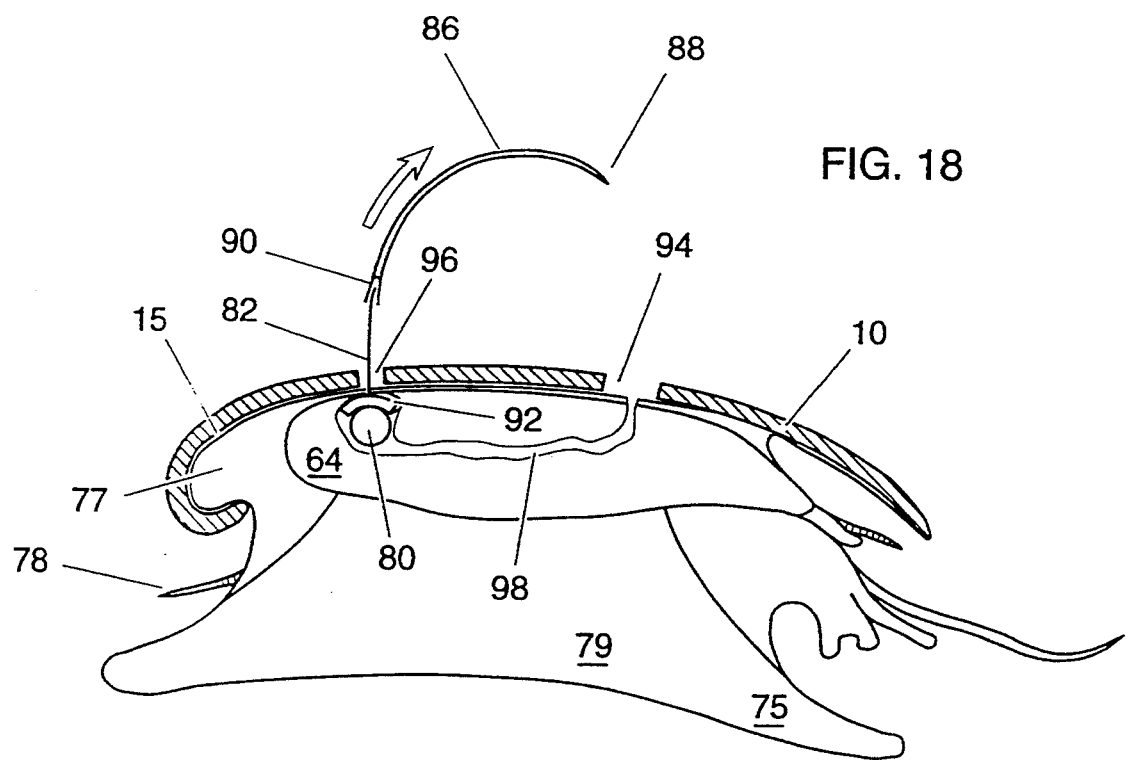

Once the leading end 88 of probe 86 emerges from opening 96 (FIG. 17), probe 86 is pulled until it is completely extracted from the abalone through opening 96 (FIG. 18). The exit wound in the gonadal tissue 64 adjacent opening 96 is roughly the diameter of probe 86. As probe 86 and attached filament 82 are withdrawn from opening 96 nucleus 80 and tissue graft 92 are drawn through wound channel 98 until they become lodged within gonadal tissue 64 immediately adjacent opening 96 (FIG. 18).

Figure 18A:
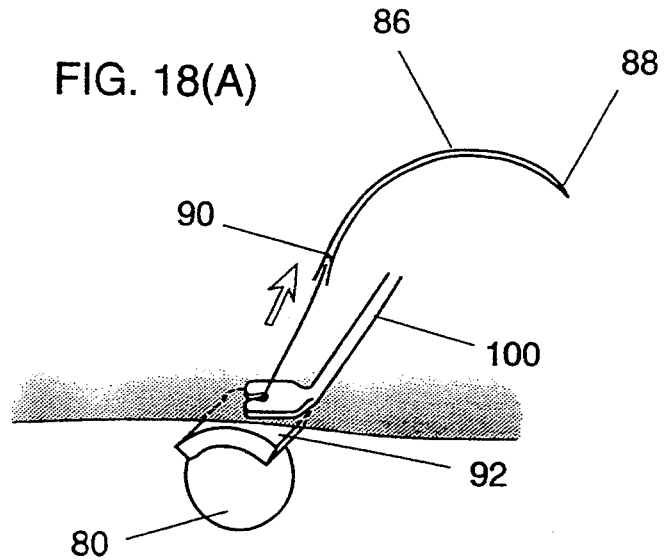

Filament 82 is then separated from nucleus 80, such as by tugging filament 82 upwardly. This procedure is only effective if nucleus 80 is of a larger diameter than exit opening 96. Alternatively, a tool 100 may be placed overlying opening 96 to provide the resistance necessary to tug filament 82 free from nucleus 80 (FIG. 18(A)).

Figure 19:
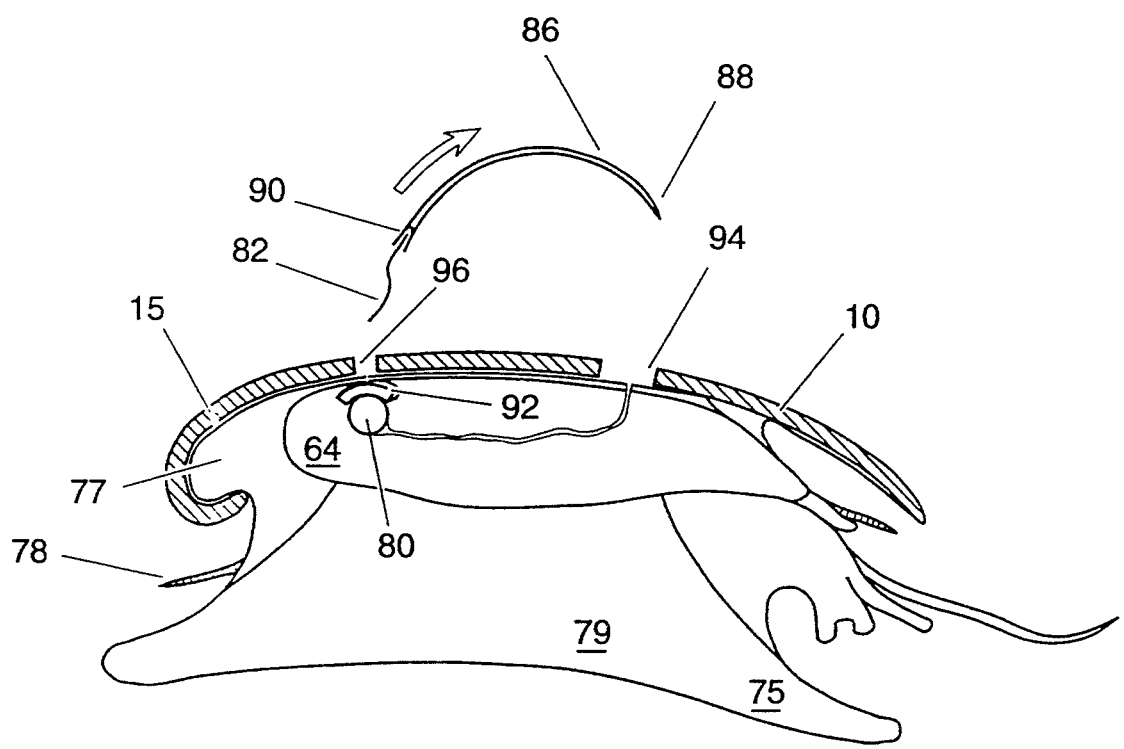

As shown in FIG. 19, nucleus 80 and tissue graft 92 remain in the preferred implantation position embedded within an outer portion of gonadal tissue 64 after filament 82 is separated from nucleus 80. Since this implantation site is removed from the initial entrance opening 94, the abalone is typically unable to expel nucleus 80 through opening 94 by the action of its foot muscle 75. The abalone is similarly unable to expel nucleus 80 through opening 96 since the exit wound in the gonadal tissue 64 is smaller than the diameter of the implanted nucleus 80. Further, the diameter of opening 96 is also preferably smaller than nucleus 80.

After nucleus 80 and graft 92 have been implanted as aforesaid, openings 94, 96 may be closed with suitable covers (not shown) secured to the abalone shell 10. Alternatively, separate nuclei could be inserted within the abalone to occlude shell opening 94 (FIG. 14a). The implanted abalone is then returned to the underwater growing bed. Nacre is gradually deposited onto the surface of nucleus 80 in the fashion described above. After a suitable growing period, typically on the order of 12–36 months, the abalone is sacrificed and the cultured pearl is removed.

Figure 22:
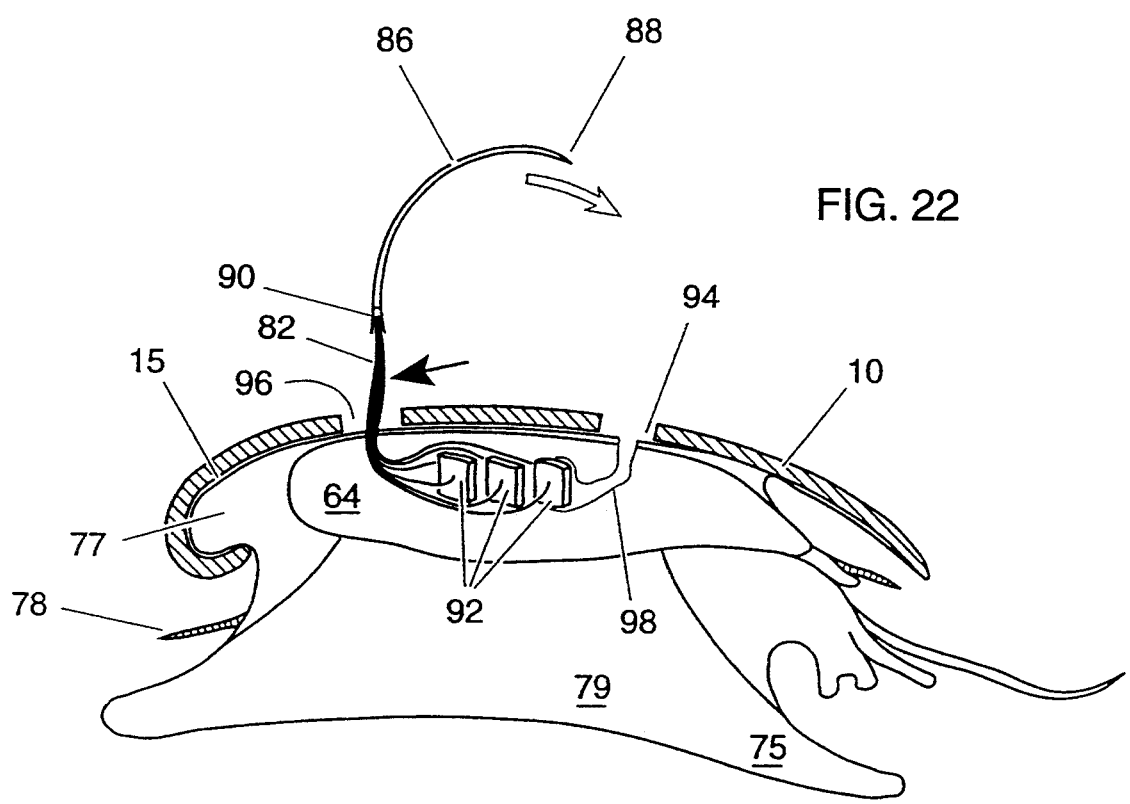

FIGS. 20–22 depict another nucleus implantation assembly and method for simultaneously producing a plurality of non-nucleated pearls in the soft tissue of a single abalone, such as gonadal tissue 64. Non-nucleated free pearls or "keshi" are typically formed from small sections of graft tissue which are implanted in the absence of a pearl nucleus 80. Non-nucleated pearls of this sort are often baroque rather than symmetrical in shape.

As shown in FIG. 20, a graft tissue assembly may be formed by loosely threading a series of filaments 82 through respective pieces of graft tissue 92. The free ends of each filament 82 are then secured to the trailing end 90 of a probe 86 with a glue adhesive (FIG. 21). Preferably, a small cavity is formed in the probe trailing end 90 to receive the filament ends (FIG. 21(A)). As shown in FIGS. 20 and 21, each of the filaments 82 are of a different length so that the respective pieces of graft tissue 92 are staggered apart.

As shown best in FIG. 22, probe 86 and the attached tissue graft tissue assembly is inserted through a first opening 94 drilled in the abalone shell 10 and is guided through the gonadal tissue 64 until probe 86 emerges from a second opening 96 as described above. Since filaments 82 are secured to probe 86 within a cavity rather than by small knots, the abalone tissue is abraded to a very limited extent as probe 86 passes therethrough.

After probe 86 has been completely withdrawn from opening 96, the filaments 82 are cut proximate to the probe's trailing end 90 as shown by the arrow in FIG. 22. Each filament 82 is then carefully withdrawn from opening 96 one at a time by pulling on one end of the filament 82, leaving the associated graft tissue sections 92 implanted within the abalone gonadal tissue 64 in spaced relation (FIG. 23). Openings 94, 96 are then occluded with suitable coverings or other nuclei as explained above and the abalone is returned to the underwater growing bed. Preferably the abalone hosts are implanted with the tissue grafts while still quite young and are allowed to develop over a period of years before the non-nucleated pearls are harvested.

Figure 24:
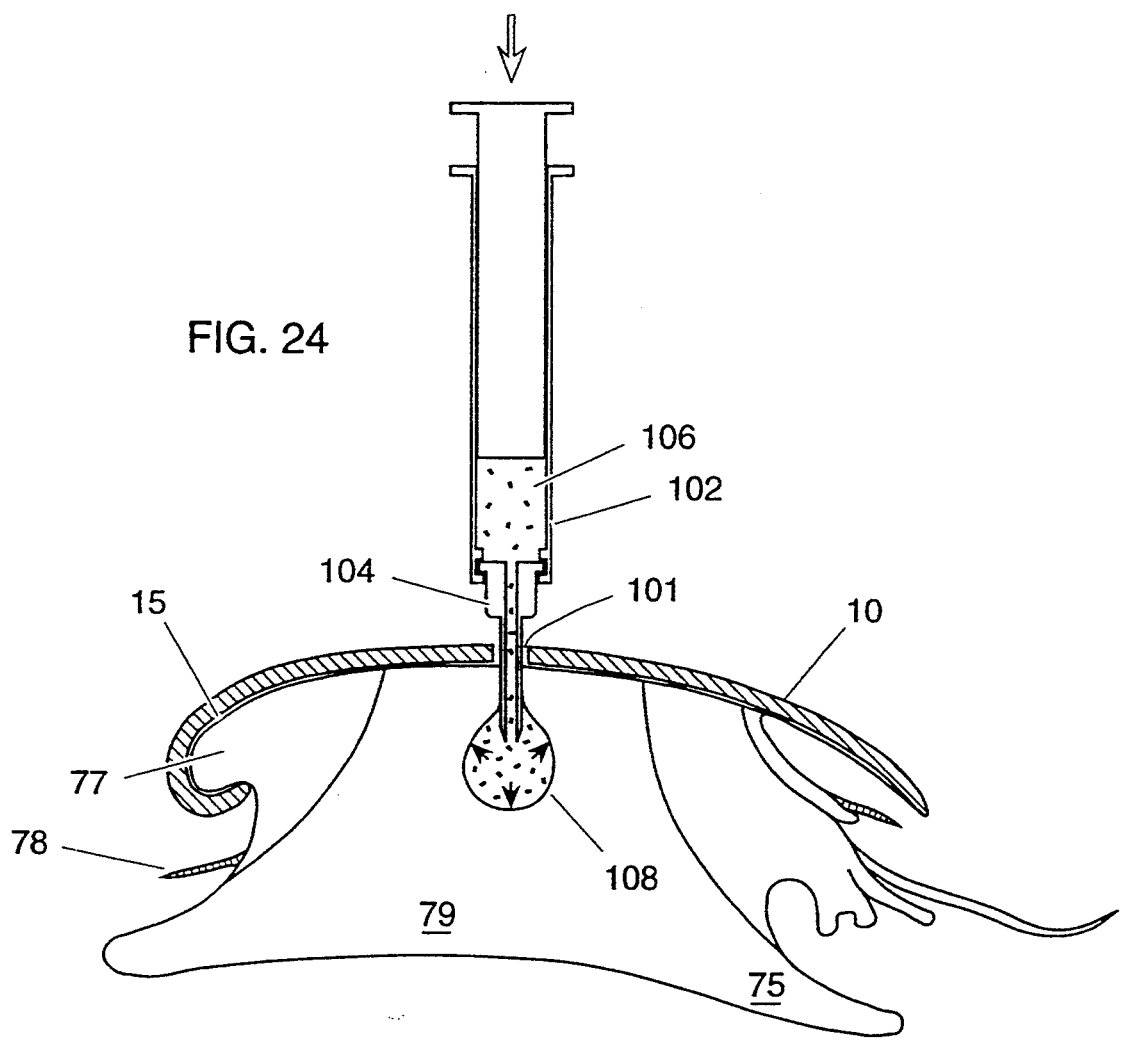
FIGS. 24–27 illustrate another alternative process for producing nucleated pearls in abalone using a hypodermic syringe.

FIGS. 24–27 depict another alternative procedure for implanting a pearl nucleus within the adductor muscle 79 of an abalone. Other soft tissues of the abalone may also be used as the implantation site. According to this procedure, a hypodermic syringe 102 including a hypodermic needle 104 is inserted into muscle tissue 79 through a small opening 101 drilled in the abalone shell 10 after the abalone has been suitably relaxed with an anaesthetic. Syringe 102 is preferably charged with a saline solution 106 containing macerated abalone tissue (or some other nacre secretion stimulating material such as tissue or chemicals derived from other organisms). Solution 106 is injected into the adductor muscle tissue 79 to form a small cavity 108 by hydraulic forces (FIG. 24). Cavity 108, which results from small tears in the muscle tissue, quickly becomes lined with the particulate tissue suspended in solution 106.

Figure 25:
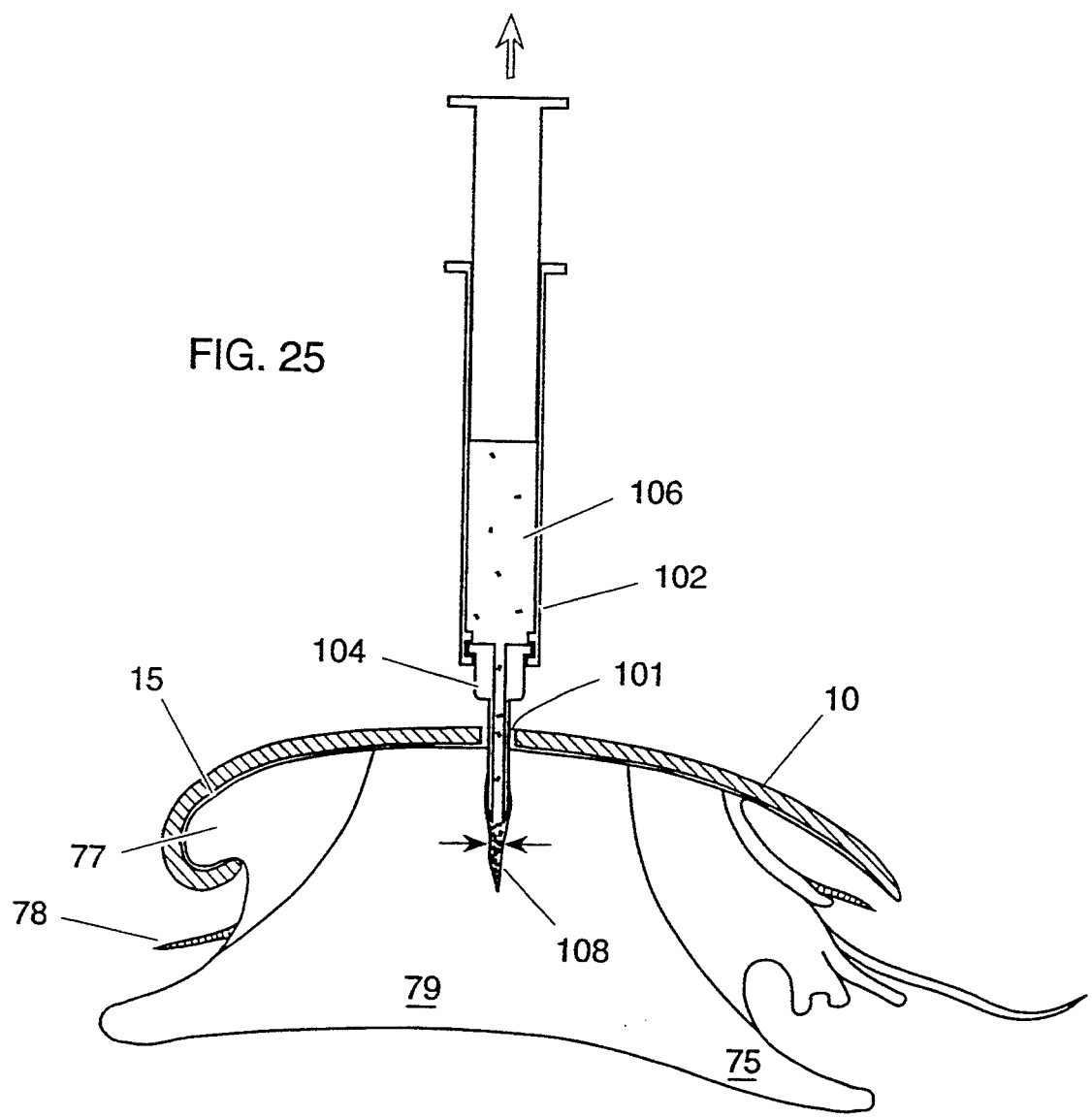
Figure 26:
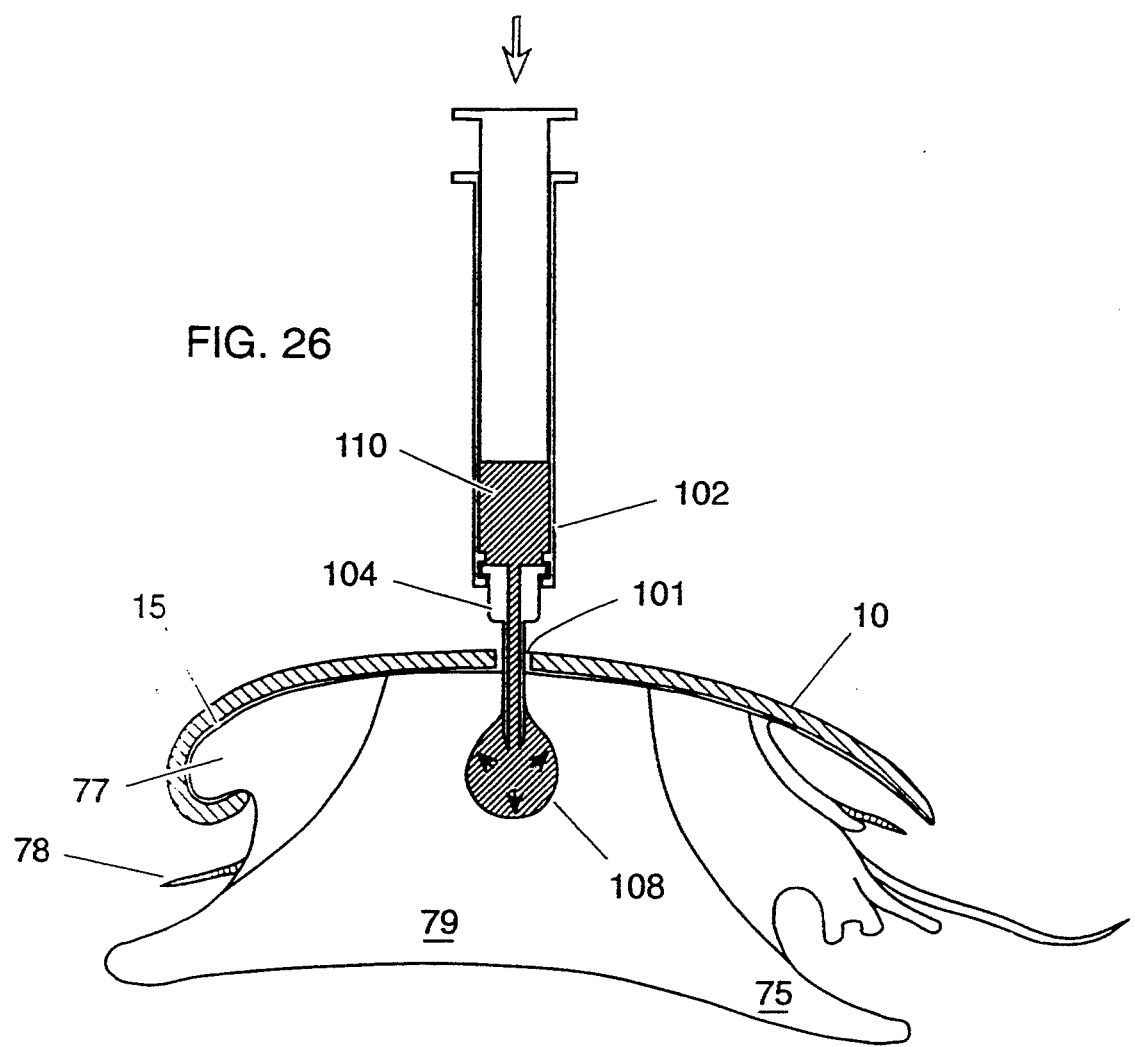
Figure 27:
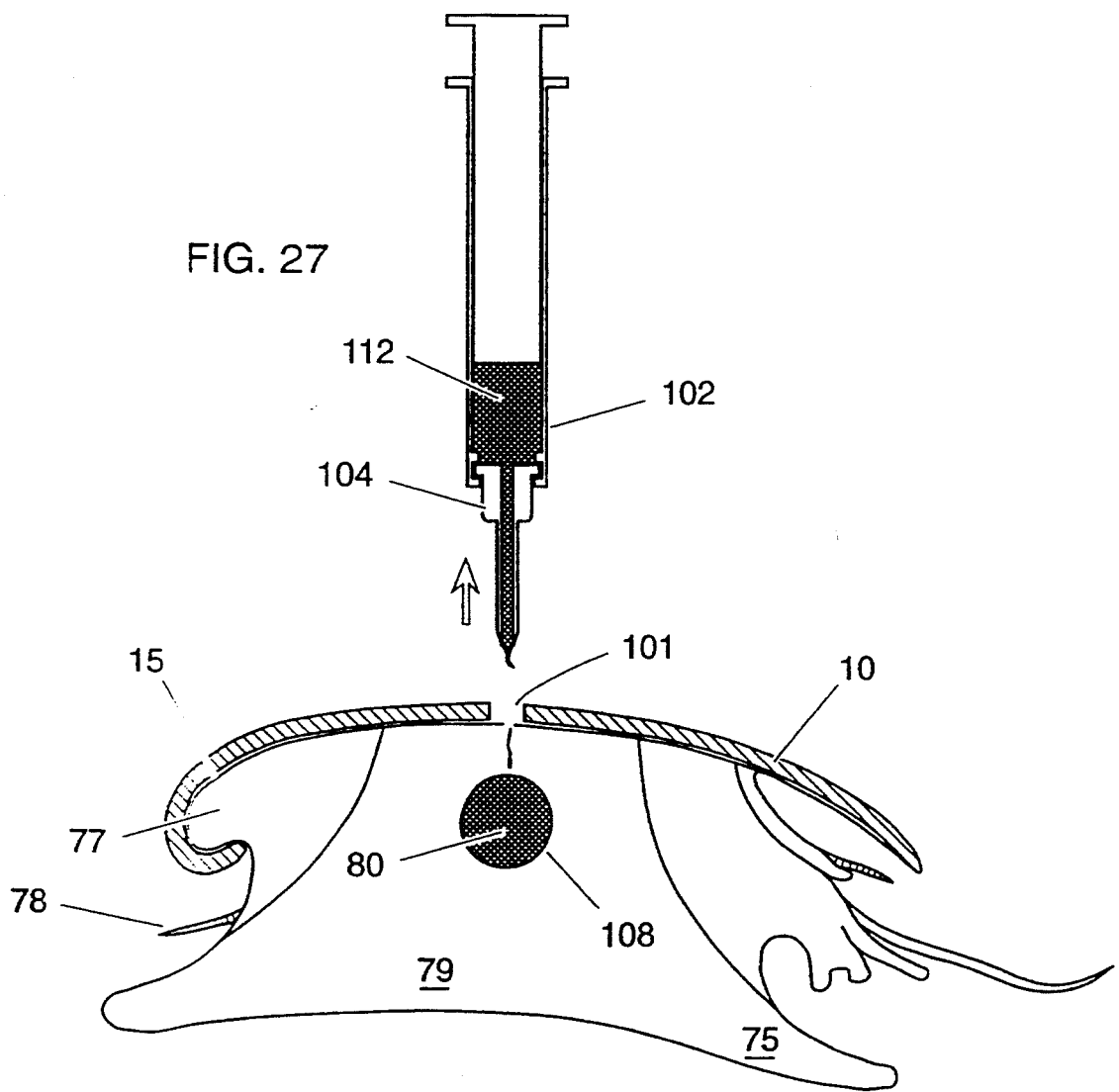

As shown in FIG. 25, the next step in the procedure is to withdraw most of solution 106 from cavity 108 into the barrel of syringe 102, thereby resulting in substantial collapse of cavity 108. Syringe 102 is then removed from the abalone and charged with a catalyzed solution of liquid epoxy resin 110 (FIG. 26). Alternatively, the hypodermic needle 104 could remain within muscle tissue 79 while the barrel of syringe 102 is recharged with the epoxy resin 110.

As shown in FIG. 26, the liquid epoxy resin 110 is then injected into cavity 108 and allowed to set, thus forming a pearl nucleus 80 embedded in the muscle tissue 79. The particulate tissue deposited on the wall of cavity 108 may enhance the secretion of nacre surrounding the outer surface of nucleus 80 in the same fashion as a conventional tissue graft. After a suitable growth period the abalone is sacrificed and a cultured pearl is harvested from muscle tissue 79.

In a variation of the above-described method, the nacre secretion stimulating material, such as macerated abalone tissue, could be mixed directly with epoxy resin 110 and introduced into the implantation site in a single injection step.

Several methods have been described herein for nucleating and producing pearls, semispherical and spherical, as well as other possible shapes, in abalone. These methods, particularly those involving the use of a pearl nucleus having the above-described configurations, have significant advantages because of the speed and reliability of the nucleation process compared to prior methods. The disclosed methods thus tend to make pearl culturing in abalone more reliable and cost effective. Also a method of culturing spherical pearls in abalone has been disclosed. Reliable spherical pearl culturing in abalone has not been accomplished heretofore using conventional methods.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A process for nucleating pearls in shell-bearing molluska including abalone, comprising the steps of:
   (a) forming an opening in the shell of a host mollusk in a region covering a soft tissue thereof, said opening having a peripheral edge extending between an exterior surface and an interior surface of said shell;
   (b) providing a pearl nucleus having a first portion around which nacre forms and a second portion securely connected to said first portion and having a region larger than the size of said opening; and
   (c) manually inserting said nucleus through said opening to an implanted position wherein said nucleus first portion is compressed against said soft tissue and said nucleus second portion physically engages said peripheral edge of said opening with a sufficient degree of force to prevent expulsion of said nucleus by said host mollusk or other molluska.

2. A process as defined in claim 1, wherein said pearl nucleus is inserted through said opening by turning said nucleus about a longitudinal axis thereof.

3. A process as defined in claim 2, wherein an outer end of said nucleus second portion furthest from said nucleus first portion has an outline which is mateable with a tool for manually turning said nucleus.

4. A process as defined in claim 2, wherein said nucleus second portion further comprises an externally threaded surface for threadingly engaging said peripheral edge of said opening.

5. A process as defined in claim 1, wherein an outer end of said nucleus second portion furthest from said nucleus first portion extends outwardly of said shell in said implanted position.

6. A process as defined in claim 5, wherein said outer end of said nucleus second portion comprises a nut-like portion.

7. A process as defined in claim 6, wherein said nut-like portion is larger than the size of said opening in said shell.

8. A process as defined in claim 6, wherein said nut-like portion has an outline which is mateable with a tool for manually turning said nucleus.

9. A process as defined in claim 6, wherein said nut-like portion is integral with the remainder of said pearl nucleus.

10. A process as defined in claim 6, wherein said nut-like portion is separate from but secured to the remainder of said pearl nucleus.

11. A process as defined in claim 1, wherein an outer end of said nucleus second portion furthest from said nucleus first portion extends substantially flush with said shell exterior surface in said implanted position.

12. A process as defined in claim 1, wherein said first and second nucleus portions are rigidly coupled together.

13. A process as defined in claim 1, wherein said pearl nucleus second portion further comprises outwardly sloping side surfaces for frictionally engaging said peripheral edge of said opening.

14. A process as defined in claim 1, wherein said opening is substantially round and wherein said opening is formed by passing a drill through said shell in a direction substantially perpendicular to said shell outer surface.

15. A process as defined in claim 14, further including the step of setting said drill to a preselected depth.

16. A process as defined in claim 1, wherein said soft tissue is the mantle-covered gonadal tissue of said mollusk.

17. A pearl nucleus for use in nucleating shell-bearing molluska including abalone, said nucleus comprising:
   (a) a first portion around which nacre forms upon insertion of said pearl nucleus into the interior of a host mollusk through an opening formed in the shell thereof, said opening having a peripheral edge extending between an outer an inner surface of said shell; and
   (b) a plug-like second portion securely connected to said first portion, wherein said second portion comprises securing means formed on an external surface thereof for physically engaging said peripheral edge of said opening with a sufficient degree of force to prevent expulsion of said nucleus by said host mollusk or other molluska.

18. A pearl nucleus as defined in claim 17, wherein an outer end of said nucleus second portion furthest from said nucleus first portion is mateable with a tool for turning said nucleus.

19. A pearl nucleus as defined in claim 18, wherein said securing means comprises an externally threaded surface on said second portion for threadingly engaging said peripheral edge of said opening.

20. A pearl nucleus as defined in claim 17, wherein said securing means comprises sloped side surfaces on said second portion for frictionally engaging said peripheral edge of said opening.

21. A pearl nucleus as defined in claim 20, wherein said side surfaces are roughened to facilitate said frictional engagement.

22. A pearl nucleus as defined in claim 17, wherein said securing means comprises resilient annular rings encircling said nucleus second portion for engaging said peripheral edge of said opening.

23. A pearl nucleus as defined in claim 17, wherein said first and second nucleus portions are rigidly coupled together.

24. A pearl nucleus as defined in claim 17, wherein an outer end of said nucleus second portion furthest from said nucleus first portion comprises a nut-like portion.

25. A pearl nucleus as defined in claim 24, wherein said nut-like portion is larger than the size of said opening in said shell.

26. A pearl nucleus as defined in claim 25, wherein said nut-like portion is integral with the remainder of said pearl nucleus.

27. A pearl nucleus as defined in claim 26, wherein said nut-like portion is separate from but secured to the remainder of said pearl nucleus.

28. A process for nucleating pearls in shell-bearing molluska including abalone, comprising the steps of:
(a) forming an opening in the shell of a host mollusk in a region covering a soft tissue thereof;
(b) inserting a pearl nucleus through said opening, wherein said pearl nucleus includes a nucleating portion and a disk portion which is substantially larger in diameter than said nucleating portion;
(c) gluing said disk portion to said shell; and
(d) clamping said disk portion in place until the glue sets by means of a clamp which is configured to fit around a portion of the said shell and which comprises end portions configured to grip the edges of said shell.

29. A process for nucleating pearls in shell-bearing molluska including abalone, comprising the steps of:
(a) forming an opening in the shell of a host mollusk in a region covering a soft tissue thereof;
(b) inserting an elongated probe through said opening and passing said probe through an interior cavity of said mollusk between said soft tissue and said shell until a tip of said probe is exposed from said mollusk;
(c) securing a filament to said exposed tip of said probe, said filament having a pearl nucleus secured thereto, wherein said nucleus is larger than the size of said opening;
(d) withdrawing said probe and at least part of said filament through said opening thereby pulling said nucleus through said cavity until said nucleus is positioned against said soft tissue adjacent opening; and
(e) securing said pearl nucleus to a portion of said shell adjacent said opening.

30. A process as defined in claim 29, wherein the step of securing comprises gluing said pearl nucleus to said shell.

31. A process as defined in claim 29, wherein said tip of said probe has an aperture formed therein and said filament is a flexible thread which is threaded through said aperture and tied to said tip, and wherein said filament is severed after said pearl nucleus has been positioned against said opening.

32. A process as defined in claim 29, wherein a plurality of openings are formed in said shell, and a plurality of nuclei are implanted within said mollusk, each of said nuclei being implanted adjacent one of said openings.

33. A process as defined in claim 32, wherein said plurality of openings are smaller than the size of said nuclei and wherein said process further includes the step of making an additional opening larger than the size of said nuclei through which said nuclei are consecutively pulled into said mollusk and then positioned against one of said plurality of openings.

34. A process for nucleating spherical pearls in shell-bearing molluska including abalone, comprising the steps of:
(a) forming an opening in the shell of a host mollusk in a region covering a soft tissue thereof;
(b) inserting a pearl nucleus through said opening until at least part of said nucleus is securely compressed against said soft tissue;
(c) allowing said pearl nucleus to remain in said mollusk for a sufficient period of time such said soft tissue in the vicinity of said pearl nucleus forms a cup-like cavity;
(d) removing said pearl nucleus from said mollusk, thereby exposing said cavity formed in said soft tissue;
(e) inserting a spherical pearl nucleus into said cavity;
(f) suturing said soft tissue so as to close said tissue substantially around said spherical nucleus; and
(g) closing said opening in said shell.

35. A process as defined in claim 34, wherein the step of suturing includes using a dissolving thread.

36. A process as defined in claim 34, further comprising the step of adding a small amount of fast-setting glue to said suture.

37. A process as defined in claim 34, wherein the step of closing includes gluing a disk over the opening formed in said shell.

38. A process for nucleating pearls in shell-bearing molluska including abalone, comprising the steps of:
(a) securing a pearl nucleus to one end of a thin filament;
(b) securing the other end of said filament to a trailing end of an elongate probe;
(c) threading said probe and said filament through a piece of graft tissue until said tissue is positioned immediately adjacent said nucleus;
(d) forming a first opening in the shell of a host mollusk, said first opening having a size exceeding the size of said pearl nucleus;
(e) forming a second opening in the shell of said mollusk spaced apart from said first opening;
(f) inserting a leading end of said elongate probe through said first opening into a soft tissue of said mollusk and passing said probe through said soft tissue until said probe leading end emerges from said second opening;
(g) withdrawing said probe and said filament from said mollusk through said second opening until said nucleus and said tissue graft become lodged within said soft tissue adjacent said second opening; and
(h) severing said nucleus from said filament.

39. A process as defined in claim 38, wherein said elongate probe is arcuately curved.

40. A process as defined in claim 39, wherein said probe has a recess formed at said trailing end for receiving said other end of said filament.

41. A process as defined in claim 38, wherein said first and second openings are formed overlying the gonadal tissue of said mollusk and wherein said probe is passed through said gonadal tissue.

42. A process as defined in claim 38, wherein said second opening has a diameter smaller than said pearl nucleus.

43. A process as defined in claim 38, further comprising the steps of closing said first and second openings after said filament is severed from said pearl nucleus.

44. A process for culturing non-nucleated free pearls in shell-bearing molluska including abalone, comprising the steps of:
  (a) loosely threading a thin filament through a piece of tissue graft;
  (b) securing the free ends of said filament to a trailing end of an elongate probe;
  (c) forming a first opening in the shell of a host mollusk in a region covering a soft tissue thereof;
  (d) forming a second opening in said shell of said mollusk spaced apart from said first opening but also overlying said soft tissue;
  (e) inserting a leading end of said probe through said first opening and passing said probe through said soft tissue until said probe leading end emerges from said second opening;
  (f) withdrawing said probe and part of said attached filament from said mollusk through said second opening;
  (g) severing said filament from said probe; and
  (h) removing said filament from said mollusk through said second opening by pulling one of the severed ends of said filament, thereby leaving said tissue graft embedded in said soft tissue.

45. A process as defined in claim 44 comprising a plurality of tissue grafts, each of said grafts having a thin filament loosely threaded therethrough, wherein the free ends of each of said filaments are secured within a cavity formed at said trailing end of said elongate probe.

46. A process as defined in 45, wherein said filaments are of varying lengths so that said plurality of tissue grafts are spaced apart.

47. A process as defined in claim 44, wherein said elongate probe is arcuately curved.

48. A process as defined in claim 44, further comprising the step of closing said first and second openings after said filament is withdrawn from said mollusk.

49. A process as defined in claim 44, wherein soft tissue is the gonadal tissue of said mollusk.

50. A process for nucleating pearls in shell-bearing molluska including abalone, comprising the steps of:
  (a) charging a hypodermic needle with a solution comprising nacre secretion stimulating material;
  (b) introducing said needle into a soft tissue of a host mollusk;
  (c) injecting said solution into said soft tissue to form a cavity therein, wherein said nacre secretion stimulating material is deposited on a portion of said soft tissue lining said cavity;
  (d) withdrawing said solution from said soft tissue to cause substantial collapse of said cavity;
  (e) charging said hypodermic needle with liquid epoxy resin;
  (f) injecting said liquid epoxy resin into said cavity; and
  (g) withdrawing said hypodermic needle from said soft tissue after a time period sufficient to allow said epoxy resin to set within said cavity to form a pearl nucleus therein.

51. A process as defined in claim 50, wherein said soft tissue is the adductor muscle of said mollusk and wherein said hypodermic needle is introduced into said muscle tissue through a hole formed in the shell of said mollusk in a region covering said muscle tissue.

52. A process as defined in claim 51, wherein said nacre secretion stimulating material comprises macerated molluska tissue.

53. A process for nucleating pearls in shell bearing molluska including abalone, comprising the steps of:
  (a) forming an opening in the shell of a host mollusk in a region covering a soft tissue thereof;
  (b) providing a pearl nucleus of a size and shape sufficient to pass through said opening in a first orientation and capable of substantially occluding said opening in a second orientation;
  (c) manually inserting said pearl nucleus through said opening in said first orientation to a position adjacent said soft tissue; and
  (d) securing said nucleus in said second orientation against an inner surface of said shell adjacent said opening to substantially occlude said opening.

54. A process as defined in claim 53, further comprising the steps of:
  (a) fastening said pearl nucleus to a filament prior to insertion of said nucleus through said opening;
  (b) maintaining said nucleus in contact with said shell inner surface by pulling on said filament; and
  (c) severing said filament from said nucleus after said nucleus is secured to said shell.

55. A process as defined in claim 53, wherein said pearl nucleus comprises a disc portion adapted to engage said shell inner surface and a bead secured to said disc portion for deposition of nacre secreted by said molluska.

56. A process for nucleating pearls in shell-bearing molluska including abalone, comprising the steps of:
  (a) forming a first opening in the shell of a host mollusk;
  (b) forming a second opening in the shell of said mollusk in a region covering a soft tissue thereof;
  (c) providing a pearl nucleus having a size and shape sufficient to pass through said first opening but not said second opening;
  (d) attaching one end of a filament to said pearl nucleus and the other end of said filament to an elongate probe;
  (e) inserting said probe through said first opening and passing said probe through an interior cavity of said mollusk between said soft tissue and said shell until said probe emerges through said second opening;
  (f) withdrawing said probe and attached filament through said second opening until said nucleus is lodged against the inner shell of said mollusk occluding said second opening;
  (g) securing said nucleus to said shell adjacent said second opening; and
  (h) severing said filament from said nucleus.

* * * * *